ary. Further, the capacity
UNITED STATES PATENT OFFICE.

HERMANN PAPE, OF HAMBURG-BILLWÄRDER, GERMANY.

PROCESS FOR OBTAINING ZINC FROM ZINCIFEROUS MATERIALS.

948,740. Specification of Letters Patent. Patented Feb. 8, 1910.

No Drawing. Application filed September 30, 1909. Serial No. 520,270.

To all whom it may concern:

Be it known that I, HERMANN PAPE, a subject of the Emperor of Germany, and residing at Hamburg-Billwärder, a. d. Bille 53, Germany, have invented a certain new and useful Improved Process for Obtaining Zinc from Zinciferous Material, of which the following is a specification.

It is well known that zinc can be obtained from zinciferous material especially such as contain only moderate quantities, by forming briquets from the raw material in question mixed with coal or similar reducing material, and treating these briquets together with small coal or coke in a continuously operating smelting apparatus the furnace mouth being open, and the briquets as well as the small coal and coke being thrown into the open furnace. The charge is then traversed by a current of air which enters at the bottom and escapes from the brightly burning furnace mouth and carries with it the zinc vapor generated in the charge, while the latter, freed from zinc is converted into a fluid mass and leaves the smelting chamber at the bottom in the fluid condition. This process is conditional on the fact that the zinciferous material, for example zinciferous slag, poor calamin or the like, is reduced to such a degree of fineness that the production of the briquets can be effected without difficulty.

It has been found in practice that a part of the zinciferous material need not be reduced to such a degree of fineness and afterward formed into briquets with coke dust or the like, but can be added to the charge in the form of lumps. For example, it is possible to thus produce zinc oxid from zinciferous slag by making briquets of coke dust and one half of the slag and feeding the other half in the form of lumps into the oxid furnace simultaneously with the briquets. Of course the proportions of slag in lumps and the slag made up into briquets may be varied. In this case the process is such that the zinciferous raw material is first passed through a stone crusher, the finer parts falling through being collected for making briquets and the coarser lumps being again crushed. The medium-sized lumps coming from the crusher however, are stopped by a sifting device and can be worked up with the briquets without further preparation, and similarly in the case of the medium sized lumps from the second crushing operation of the coarser parts. In this process the furnace is so charged that at each fresh charge, small coke or coal is first thrown in, the briquets are next placed thereon and finally the zinciferous material in lumps is strewn over the briquets so that the zinciferous material used for the charge, is evenly distributed over the entire surface of the furnace mouth. When the charge sinks, the lumps of zinciferous material first become red-hot and then soft. On subsequent charging, the next layer of small coal or coke rests on the red-hot zinciferous lumps, and raises them to a still higher degree of heat as soon as the coke or coal has become red-hot, which takes place very quickly. These lumps of zinciferous material heated to a very high temperature then lie bedded in between red-hot coke and red-hot or burning briquets and are thereby brought to the melting point, the single drops from these lumps coming into contact on all sides with red-hot carbon and thereby giving up the zinc they contain. It is however possible to proceed with the addition of the lump material in another manner than by strewing it over the layer of small coke and briquets fed into the melting apparatus, and this may consist in mixing the lump material with the charge, the mixture being fed into the smelting apparatus.

The operation of the new process is of considerable importance in two respects. Firstly it is possible to use the ore in lumps without a further addition of reducing material and small coke, as, according to experience obtained the quantities of reducing material contained in the briquets and the quantity of small coke necessary for the combustion of the latter are quite sufficient to effect also the removal of zinc from the zinciferous material in lumps added to the charge. In this way the process naturally operates in an extremely economic manner, and correspondingly reduces the working cost of treating a given quantity of zinciferous raw material. Further, the capacity of the smelting apparatus is increased in a corresponding manner, as according to experience obtained only a definite quantity of briquets can be burned in a given smelting apparatus. The addition of material in lumps therefore results in an increase in the output without any alteration having to be made in the smelting apparatus.

Having now described my invention what

I claim as new and desire to secure by Letters Patent is:

1. A process for obtaining zinc of the character described, consisting in feeding into a furnace a charge of fuel, briquets of zinciferous material mixed with a reducing agent, and finally lumps of zinciferous material.

2. A process for obtaining zinc of the character described, consisting in feeding into a furnace a charge of small fuel, briquets composed of pulverized zinciferous material and a reducing agent, and finally lumps of zinciferous material.

3. A process for obtaining zinc of the character described, consisting in feeding into a smelting furnace, a charge of small fuel, briquets composed of pulverized zinciferous material and a reducing agent and finally lumps of zinciferous material, followed at predetermined intervals by a series of such charges superposed one on top of another.

In testimony whereof I have signed my name to this specification in the presence of two subscribing witnesses.

HERMANN PAPE.

Witnesses:
ERNEST H. L. MUMMENHOFF,
IDA CHR. HAFERMANN.